US012140230B2

(12) United States Patent
Masuda

(10) Patent No.: US 12,140,230 B2
(45) Date of Patent: Nov. 12, 2024

(54) BUTTERFLY VALVE

(71) Applicant: ASAHI YUKIZAI CORPORATION, Nobeoka (JP)

(72) Inventor: Kensuke Masuda, Nobeoka (JP)

(73) Assignee: ASAHI YUKIZAI CORPORATION, Nobeoka (JP)

( * ) Notice: Subject to any disclaimer, the term of this patent is extended or adjusted under 35 U.S.C. 154(b) by 31 days.

(21) Appl. No.: 18/018,767

(22) PCT Filed: Jul. 29, 2021

(86) PCT No.: PCT/JP2021/028059
§ 371 (c)(1),
(2) Date: Jan. 30, 2023

(87) PCT Pub. No.: WO2022/025169
PCT Pub. Date: Feb. 3, 2022

(65) Prior Publication Data
US 2023/0304584 A1    Sep. 28, 2023

(30) Foreign Application Priority Data
Jul. 31, 2020  (JP) .................................. 2020-131218

(51) Int. Cl.
*F16K 1/226* (2006.01)
*F16K 1/22* (2006.01)

(52) U.S. Cl.
CPC ............ *F16K 1/2261* (2013.01); *F16K 1/222* (2013.01); *F16K 1/2263* (2013.01)

(58) Field of Classification Search
CPC .............................. F16K 1/2261; F16K 1/2263
See application file for complete search history.

(56) References Cited

U.S. PATENT DOCUMENTS

| 3,633,872 A | 1/1972 | Wright |
| 4,133,513 A * | 1/1979 | Meyer ................... F16K 1/2265 251/368 |

(Continued)

FOREIGN PATENT DOCUMENTS

| EP | 3489555 A1 | 5/2019 |
| JP | S49-14821 B1 | 4/1974 |

(Continued)

OTHER PUBLICATIONS

PCT/ISA/210, "International Search Report for PCT International Application No. PCT/JP2021/028059," Oct. 19, 2021.

(Continued)

*Primary Examiner* — Kevin F Murphy
(74) *Attorney, Agent, or Firm* — HAUPTMAN HAM, LLP

(57) ABSTRACT

A butterfly valve includes a valve body with an internal flow passage, a seat ring attached to an inner peripheral surface of the internal flow passage, a valve stem rotatably supported by the valve body, and a valve element rotatably supported by the valve body via the valve stem. The valve element has an annular outer peripheral edge surface, and includes, at opposite positions in the direction of the rotation axis on the outer peripheral edge surface, two valve-stem openings for the valve shaft to pass therethrough. The outer peripheral edge surface of the valve element includes two annular opening raised portions each extending along the periphery of the corresponding valve stem openings, and peripheral edge raised portions connecting the two opening raised portions, each having a peripheral edge sealing surface extending along a top thereof, and chamfered surfaces inclined and extending along both sides of the peripheral sealing surface.

10 Claims, 15 Drawing Sheets

(56) References Cited

U.S. PATENT DOCUMENTS

| | | | | |
|---|---|---|---|---|
| 4,491,300 A | * | 1/1985 | Wilson | F16K 1/2263 |
| | | | | 251/368 |
| 9,903,496 B2 | * | 2/2018 | Abouelleil | F16K 1/2265 |
| 11,428,326 B2 | * | 8/2022 | Gomi | F16K 25/00 |
| 2019/0277408 A1 | | 9/2019 | Matsushita | |
| 2021/0172531 A1 | | 6/2021 | Matsushita | |

FOREIGN PATENT DOCUMENTS

| | | | |
|---|---|---|---|
| JP | 2004-183711 A | 7/2004 | |
| JP | 2005-233294 A | 9/2005 | |
| JP | 2016-041967 A | 3/2016 | |
| WO | 2015/147197 A1 | 10/2015 | |
| WO | WO-2020138347 A1 * | 7/2020 | F16K 1/222 |
| WO | 2021/132712 A1 | 7/2021 | |

OTHER PUBLICATIONS

European Patent Office, "Partial Supplementary EP Search Report for EP Application No. 21851565.8", Jul. 19, 2024, 14 pp.

\* cited by examiner

BUTTERFLY VALVE

RELATED APPLICATIONS

The present application is National Phase of International Application No. PCT/JP2021/028059 filed Jul. 29, 2021, and claims priority from Japanese Application No. 2020-131218, filed Jul. 31, 2020, the disclosure of which is hereby incorporated by reference herein in its entirety.

TECHNICAL FIELD

The present invention relates to a butterfly valve, which is suitably used for piping lines of various industries, such as chemical factories, water supply and sewage, agriculture and fishery, a semiconductor manufacturing field, and a food field.

BACKGROUND ART

A butterfly valve includes a valve body formed therein with an internal flow passage, a seat ring mounted on the inner peripheral surface of the internal flow passage of the valve body, a valve stem extending through the seat ring and rotatably supported by the valve body, and a valve element placed in the seat ring and fixedly attached to the valve stem so as to rotate with the valve stem. The valve element is rotated about the rotation axis in the valve body using the valve stem so that the outer peripheral edge surface of the valve element is brought into pressure contact with or separated from the valve seat surface formed on the inner peripheral surface of the seat ring, thereby opening and closing the valve.

The valve body has a pair of bearing holes provided for inserting and supporting the valve stem at positions opposite to each other in the radial direction of the internal flow passage. The seat ring includes a ring body of a substantially tubular shape extending in the direction of the center axis, and annular flange portions provided at both end portions of the ring body in the direction of the center axis thereof and extending outward. The seat ring is mounted on the inner peripheral surface of the internal flow passage of the valve body by fitting the flange portions of the seat ring into fitting recesses provided in the areas surrounding opening portions at both ends of the internal flow passage of the valve body. The seat ring has a pair of through-holes formed at positions opposite to each other in the radial direction of the ring body to allow the valve stem to pass through.

In such a butterfly valve, the outer peripheral edge surface of the valve element placed in the seat ring (in detail, its ring body) mounted on the inner peripheral surface of the internal flow passage is brought into close contact with the valve seat surface formed on the inner peripheral surface of the seat ring for sealing, so that the internal flow passage is closed by the valve element. In order to ensure the sealing between the outer peripheral edge surface of the valve element and the valve seat surface of the seat ring, it is necessary to increase the surface pressure that presses the outer peripheral edge surface against the valve seat surface. However, if the surface pressure that presses the outer peripheral edge surface against the valve seat surface is increased, the resistance will increase when the valve element is rotated in closing the valve to bring the outer peripheral edge surface of the valve body into pressure contact with the valve seat surface. This increases the operating torque of the valve stem for rotating the valve element. In order to reduce this operating torque, a butterfly valve, for example, as described in PTL1, is proposed, which includes the valve element having the outer peripheral edge surface that is shaped like a spherical surface with a radius slightly larger than the distance from the center of the valve element to the valve seat surface, so as to make the outer peripheral edge surface smoothly come in contact with the valve seat surface.

When the outer peripheral edge surface of the valve element of the butterfly valve is brought in pressure contact with the valve seat surface of the seat ring for providing sealing, the effective surface pressure becomes low near the through-holes which allow the valve stem to pass therethrough. As a result, the sealing performance is decreased near the through-holes under a condition where a compression rate of the seat ring is the same, thereby making leakage more likely to occur. Therefore, a butterfly valve, for example, as described in PTL2, is proposed, in which the outer circumference of the ring body of the seat ring is formed in an elliptic shape with the stem direction as its long axis, and the inner circumference is formed in a circular shape, so that the crushing margin is increased around the through-holes, thereby increasing the effective surface pressure near the through-holes and thus improving the sealing performance.

CITATION LIST

Patent Literature

PTL1: Japanese Unexamined Patent Publication No. 2005-233294
PTL2: Japanese Unexamined Patent Publication No. 2004-183711

SUMMARY OF THE INVENTION

Technical Problem

A small-diameter butterfly valve employs a structure as described above, in which a seat ring having an elliptical outer peripheral surface and a valve element having a spherical outer peripheral edge surface are combined. However, for large-diameter butterfly valves, it is difficult and expensive to machine the outer peripheral edge surface of the valve element into a spherical shape. Therefore, the problem still remains that the resistance of the outer peripheral edge surface of the valve element against the valve seat surface of the seat ring will increase in closing the valve and the operating torque of the valve element is high if the surface pressure of the outer peripheral edge surface of the valve element against the valve seat surface of the seat ring is increased in order to keep sufficient sealing performance. Furthermore, there arises a problem that the operating torque of the valve element goes up when the side portion (corner) of the outer peripheral edge surface of the valve element comes in contact with the valve seat surface of the seat ring in closing the valve.

If the surface pressure of the outer peripheral edge surface of the valve element against the seat surface of the seat ring is reduced to decrease the operating torque, then the sealing performance in the areas surrounding the through-holes of the seat ring will decrease.

Accordingly, it is an object of the present invention to solve the problems existing in the prior art and provide a large-diameter butterfly valve which can ensure the necessary sealing performance between the valve element and the valve seat surface while suppressing an increase in the operating torque of the valve element in closing the valve.

Solution to Problem

In view of the above-described object, the present invention provides a butterfly valve includes: a valve body formed therein with an internal flow passage extending in a direction of a flow passage axis; a seat ring attached to an inner peripheral surface of the internal flow passage; a valve stem supported by the valve body to be rotatable about a rotation axis; a substantially disk-shaped valve element connected to the valve stem to be rotatably supported by the valve body and being placed in the seat ring, the internal passage being closed and opened by rotating the valve element about the rotation axis to bring a peripheral edge portion of the valve element into and out of contact with an inner peripheral surface of the seat ring, in which the valve element has an annular outer peripheral edge surface circumferentially extending thereon, and is formed, at opposite positions in the direction of the rotation axis on the outer peripheral edge surface, with two valve stem openings for allowing the valve stem to pass therethrough, the outer peripheral edge surface of the valve element further provided with two annular opening raised portions each protruding from the outer peripheral edge surface and extending along the periphery of the corresponding valve stem opening, and peripheral edge raised portions each protruding from the outer peripheral edge surface and extending in the circumferential direction of the valve element so as to connect between the two opening raised portions, each of the peripheral edge raised portions having a peripheral edge sealing surface that extends along a top thereof to be like an arc in the circumferential direction and flat in the width direction, and chamfered surfaces inclined at a predetermined angle relative to the peripheral edge sealing surface toward the outer peripheral edge surface of the valve element and extending along both sides of the peripheral edge sealing surface.

In the above-described butterfly valve, the peripheral edge raised portion protruding from the outer peripheral edge surface of the valve element has a planar peripheral edge sealing surface extending along the top in the circumferential direction, and chamfered surfaces inclined at a predetermined angle relative to the peripheral edge sealing surface toward the outer peripheral edge surface of the valve element and extending along both sides of the peripheral edge sealing surface. The planar peripheral edge sealing surface formed on the top of the peripheral edge raised portion of the valve element is brought into pressure contact with the inner peripheral surface of the seat ring, so that the pressure from the peripheral edge raised portion of the valve element to the inner peripheral surface of the seat ring concentrates on the peripheral edge sealing surface, thus increasing the sealing pressure. Furthermore, the chamfered surfaces, which are inclined relative to the peripheral edge sealing surface and extend along both sides of the peripheral edge sealing surface, can reduce the resistance of the peripheral edge raised portion of the valve element against the inner peripheral surface of the seat ring when the valve element rotates to come in contact with the inner peripheral surface.

Preferably, in the butterfly valve as described above, the predetermined angle ranges from 15° to 30°. Preferably, the width of the peripheral edge sealing surface ranges from 3 mm to 10 mm. When the angle of the chamfered surface relative to the peripheral edge sealing surface is in the above range, the operating torque can be particularly reduced. Further, when the width of the peripheral edge sealing surface is in the range, it is possible to achieve both the effect of concentrating the surface pressure by the peripheral seal surface and the wear durability in applications where the valve is repeatedly opened and closed.

The seat ring is provided with an outer peripheral surface, an inner peripheral surface, and an annular protrusion protruding from the outer peripheral surface and extending annularly, and the valve body is provided on the inner peripheral surface of the internal flow passage with an annular fitting groove for the annular protrusion of the seat ring to fit therein.

In this case, preferably, the annular fitting groove is formed, at opposite positions in the direction of the rotation axis, with two bearing holes for the valve stem to be inserted and be supported therein, and the annular fitting groove includes two opening groove portions provided at the peripheries of the openings of the two bearing holes and two peripheral edge groove portions extending circumferentially so as to connect between the two opening groove portions, one of the two peripheral edge groove portions being provided with a chamfered portion at an upper edge on a downstream side, the other of the two peripheral edge groove portions being provided with a chamfered portion at an upper edge on a upstream side. More preferably, the peripheral edge groove portions of the annular fitting groove have a rectangular cross section, each of the chamfered portions is formed by an inclined surface, and an angle between the inclined surface and an extended plane of a side surface of the peripheral edge groove portion is determined to match an angle of rotation of the valve element when the peripheral edge sealing surface of the peripheral edge raised portion of the valve element comes in contact with the inclined surface, where the angle of rotation of the valve element when the butterfly valve is fully open is set to 0°.

Preferably, the seat ring is formed, at opposite positions in the direction of the rotation axis, with two through-holes extending from the outer peripheral surface to the inner peripheral surface to allow the valve stem to pass through the seat ring, the seat ring is formed, on the inner peripheral surface thereof, with two annular through-hole sealing surfaces each extending at the periphery of the corresponding through-hole to extend planarly, valve seat surfaces extending like an arc in the circumferential direction of the inner peripheral surface to connect between the two through-hole sealing surfaces, and inner peripheral transition surfaces connecting between the through-hole sealing surfaces and the valve seat surfaces, and the valve element is formed, on the outer peripheral surface, with annular opening sealing surfaces each extending on a top of the corresponding opening raised portion, and outer peripheral transition surfaces connecting between the opening sealing surfaces and the peripheral edge sealing surfaces, each of the inner peripheral transition surfaces extending like an arc to be coaxial with the through-hole and being located at a position to come in contact with the outer peripheral transition surface in closing the valve. In this case, preferably, the valve seat surface formed on the inner peripheral surface of the seat ring has a concave shape formed like a part of a spherical surface.

Preferably, the annular protrusion includes two annular through-hole protrusion portions each provided at a peripheral edge portion of the corresponding through-hole on the outer peripheral surface of the seat ring, and two outer peripheral protrusion portions extending in the circumferential direction to connect between the two through-hole protrusion portions, each of the through-hole protrusion portions is formed on a top thereof with a protrusion portion sealing surface extending parallel to the through-hole sealing surface, and a thickness from the through-hole sealing surface to the protrusion portion sealing surface is equal to a thickness from the valve seat surface of the seat ring to a top of the outer peripheral protrusion portion.

In addition, preferably, the seat ring is formed, at opposite positions in the direction of the rotation axis, with two through-holes extending from the outer peripheral surface to the inner peripheral surface in order to allow the valve stem to pass through the seat ring, and the seat ring is formed, on the inner peripheral surface, with two annular through-hole sealing surfaces each extending planarly at the periphery of the corresponding through-hole, and valve seat surfaces extending like an arc in the circumferential direction of the inner peripheral surface to connect between the two through-hole sealing surfaces, the annular protrusion having a width larger than that of the valve seat surface.

In one embodiment of the above-described butterfly valve, the valve body is provided with a thickness reduction part on the outer periphery other than regions adjacent to the bearing holes on both sides of the rotation axis within a predetermined angle range around the center of the internal flow passage from the rotation axis. In this case, preferably, the predetermined angle is in the range of 40° to 60°.

Advantageous Effect of the Invention

In the butterfly valve according to the present invention, the planar peripheral edge sealing surface formed on the top of the peripheral edge raised portion of the valve element is brought into pressure contact with the inner peripheral surface of the seat ring, so that the pressure from the peripheral edge raised portion of the valve element to the inner peripheral surface of the seat ring concentrates on the peripheral edge sealing surface, thereby increasing the sealing pressure. As a result, the sealing performance between the outer peripheral edge surface of the valve element and the seat surface of the seat ring can be enhanced while suppressing the pressing force acting from the valve element to the seat surface of the seat ring to be small. Furthermore, the chamfered surfaces, which are inclined relative to the peripheral edge sealing surface and extend along both sides of the peripheral edge sealing surface, can reduce the resistance of the peripheral edge raised portion of the valve element against the inner peripheral surface of the seat ring when the valve element rotates to come in contact with the inner peripheral surface. Therefore, the operating torque can be reduced when the valve element is rotated by operating the valve stem to bring the peripheral edge raised portion of the valve element into pressure contact with the inner peripheral surface of the seat ring. In this way, the present invention secures the necessary sealing performance between the valve element and the valve seat surface while suppressing an increase in the operating torque of the valve element in closing the valve.

DESCRIPTION OF EMBODIMENTS

While an embodiment of a butterfly valve 11 according to the present invention will be described below with reference to the drawings, it goes without saying that the present invention should not be limited to the embodiment.

Figure 1:
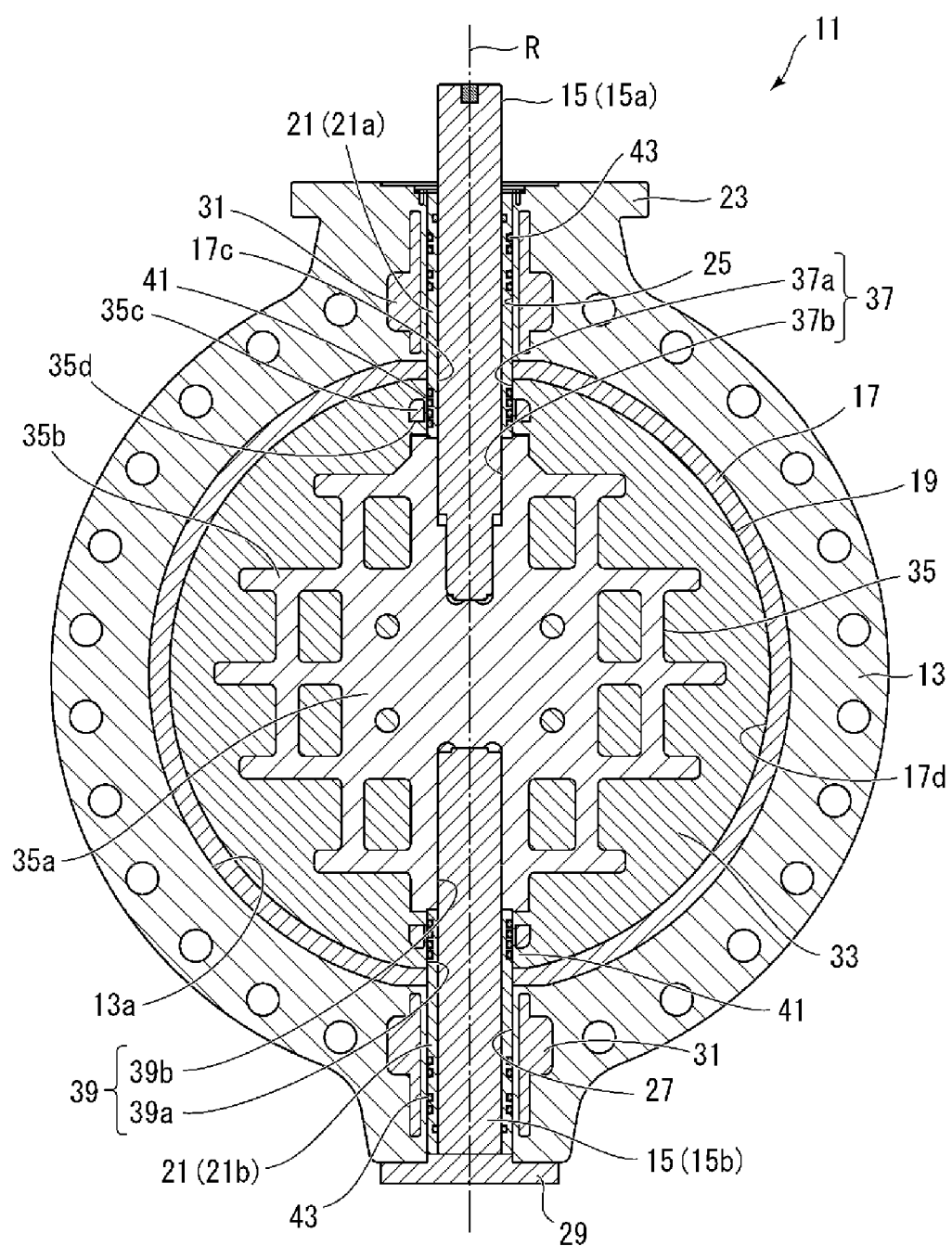
FIG. 1 is a longitudinal cross-sectional view of a butterfly valve in the valve closed state according to an embodiment of the present invention, as viewed from a direction of a flow passage axis.
Figure 2:
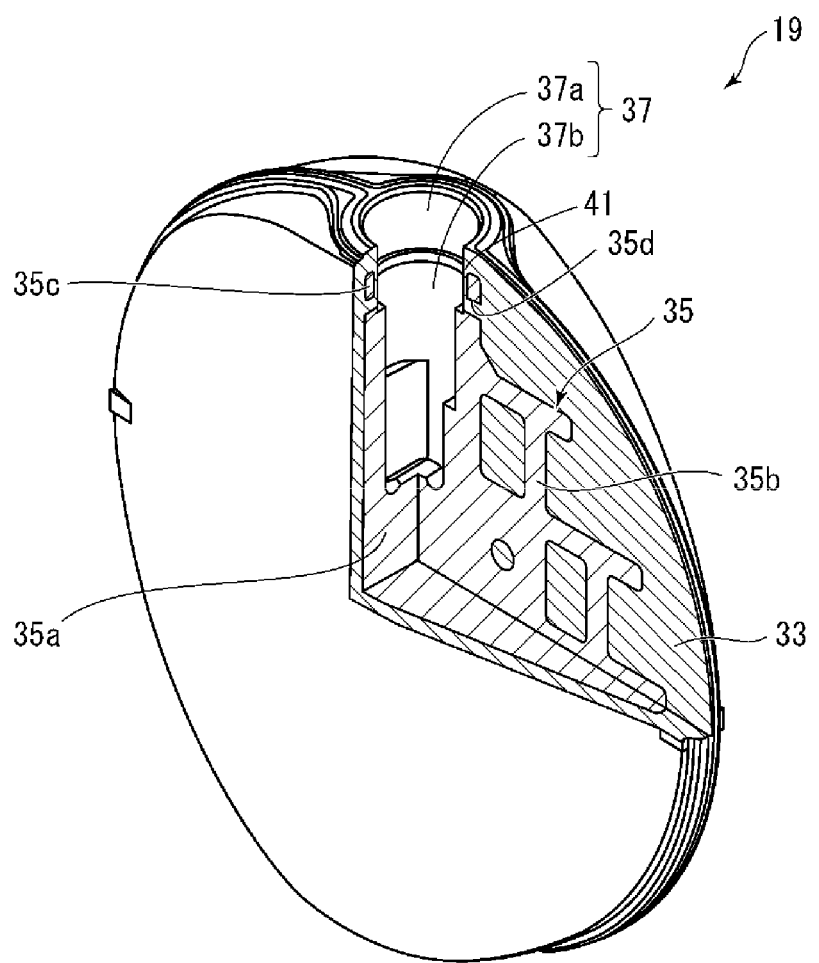
FIG. 2 is a partial cross-sectional perspective view, swing a valve element of the butterfly valve shown in FIG. 1.

First, an overall configuration of the butterfly valve 11 will be described with reference to FIGS. 1 and 2. FIG. 1 is a longitudinal cross-sectional view of the butterfly valve as viewed from a direction of a flow passage axis, and shows a valve closed state. FIG. 2 is a partial cross-sectional perspective view, showing a valve element of the butterfly valve shown in FIG. 1 that is partially broken to be shown in section.

The butterfly valve 11 is provided with a substantially hollow cylindrical valve body 13 formed therein with an internal flow passage 13a extending in a direction of a flow passage axis, a valve stem 15 rotatably supported by the valve body 13, an annular seat ring 17 attached to the inner periphery of the internal flow passage 13a, a valve element 19 placed in the internal flow passage 13a and connected to the valve stem 15 so that the valve element 19 is supported by the valve body 13 to be rotatable about a rotation axis R, and a bushing 21 made of a synthetic resin material and rotatably fitted around the valve stem 15. The butterfly valve 11 is configured so that the internal flow passage 13a can be closed and opened by bringing an inner peripheral surface of the seat ring 17 and an outer peripheral edge portion of the valve element 19 into and out of contact with each other.

In the shown embodiment of the butterfly valve 11, the valve stem 15 is configured by a first valve stem 15a arranged on an upper side in FIG. 1 along the rotation axis R and a second valve stem 15b arranged on a lower side in FIG. 1, and the bushing 21 is also configured by a first bushing 21a rotatably fitted around the first valve stem 15a and a second bushing 21b rotatably fitted around the second valve stem 15b. The valve element 19 is supported by the first valve stem 15a and the second valve stem 15b via the first bushing 21a and the second bushing 21b, respectively, to be rotatable relative to the valve body 13. There is a driving unit (not shown) connected to the first valve stem 15a, and the driving unit is used to rotate the first valve stem 15a, thereby rotating the valve element 19 about the rotation axis R to open and close the valve. In the shown embodiment, the valve stem 15 is configured by two valve stems 15, that is, the first valve stem 15a and the second valve stem 15b. However, the first valve stem 15a and second valve stem 15b may be integrally formed to be a single valve stem 15. Similarly, the first bushing 21a and second bushing 21b may be integrally formed to be a single bushing 21. The first valve stem 15a and second valve stem 15b are formed of metal materials such as cast iron, steel, carbon steel, copper, copper alloys, brass, stainless steel, aluminum, and titanium, but the materials of the first stem 15a and second valve stem 15b are not particularly limited as long as they pose no problems in terms of strength.

The valve body 13 is formed of a synthetic resin material. Examples of synthetic resin materials which can be used for the valve body 13 include polyvinyl chloride (PVC), polypropylene (PP), polyvinylidene fluoride (PVDF), polyethylene (PE), polyphenylene sulfide (PPS), polydicyclopentadiene (PDCPD), polytetrafluoroethylene (PTFE), acrylonitrile butadiene styrene resin (ABS resin), chlorinated polyvinyl chloride (PVC-C), perfluoroalkoxyalkane (PFA), polydicyclopentadiene (PDCPD), fiber reinforced plastic (FRP) and these synthetic resin materials reinforced with glass fibers. The valve body 13 has a substantially disk-shaped top flange 23 at the top thereof. The valve body 13 has a first bearing hole 25 and a second bearing hole 27 which are opposed to each other in a radial direction (a vertical direction in FIG. 1) of the internal flow passage 13a and extend from the internal flow passage 13a to the outside.

The first bearing hole 25 extends through the top flange 23. The first valve stem 15a, around which the first bushing 21a is fitted, is inserted into the first bearing hole 25, so that the first valve stem 15a is rotatably supported in the first bearing hole 25 via the first bushing 21a. The upper end of the first valve stem 15a inserted into the first bearing hole 25 protrudes from the top flange 23 to be able to be connected to the driving unit placed above the top flange 23. Examples of the driving unit which can be used include lever-type, gear-type, and automatic drivers. The lower ends of the first valve stem 15a and the first bushing 21a inserted into the first bearing hole 25 extend out of the first bearing hole 25 to protrude into the internal flow passage 13a. Similarly, the second valve stem 15b, around which the second bushing 21b is fitted, is inserted in the second bearing hole 27, so that the second valve stem 15b is rotatably supported in the second bearing hole 27 via the second bushing 21b. The second bearing hole 27 is closed at the lower end thereof by a valve stem holder 29, so that the lower ends of the second valve stem 15b and the second bushing 21b inserted into the second bearing hole 27 abut on the valve stem holder 29. The upper ends of the second valve stem 15b and the second bushing 21b inserted into the second bearing hole 27 extend out of the second bearing hole 27 to protrude into the internal flow passage 13a.

The interior of the valve body 13 includes reinforcing metal insert members 31 spaced apart from and surrounding the first bearing hole 25 and the second bearing hole 27. Stainless steel for casting is used as the metal material for forming the insert members 31, but a material used for the insert members 31 is not limited to this. The insert members 31 may be formed of other metal materials similar to those of the valve stem 15 or non-metallic materials as long as the materials have higher mechanical strength than the valve body 13.

In the embodiment shown in FIG. 1, each of the insert members 31 has a substantially tubular shape. Specifically, each insert member 31 has a central portion of a substantially rectangular parallelepiped shape, a column portion positioned farther from the internal flow passage 13a than the central portion, and a base portion positioned closer to the internal flow passage 13a than the central portion and being larger than the column portion and smaller than the central portion. The insert member 31 has a through-hole having a diameter larger than the first bearing hole 25 and the second bearing hole 27 and formed in the center of the column portion, the central portion, and the base portion. The central portion is formed to have a bolt hole for screwing with a bolt to connect the valve body 13 with a pipe. These insert members 31 of such a shape are spaced radially outward of the first and second bearing holes 25 and 27. These insert members 31 are embedded in the valve body 13 so as not to be exposed in the first bearing hole 25 and the second bearing hole 27, because this prevents the metal insert members 31 from coming into contact with corrosive fluid that might flow into the first bearing hole 25 and the second bearing hole 27.

For instance, the seat ring 17 is formed of elastic materials such as ethylene propylene rubber (EPDM), chloroprene rubber (CR), isoprene rubber (IR), chlorosulfonated rubber (CSM), nitrile rubber (NBR), styrene-butadiene rubber (SBR), chlorinated polyethylene (CM), fluororubber (FKM), hydrogenated acrylonitrile butadiene rubber (HNBR), urethane rubber (U), silicone rubber (VMQ, FVMQ), ethylene propylene rubber (EPM), acrylic rubber (ACM), and butyl rubber (IIR), and these elastic materials coated with fluororesin. These elastic materials are just examples, and the materials are not particularly limited as long as they pose no problems in terms of strength and corrosion resistance in use. The seat ring 17 includes a ring body 17a having a substantially cylindrical shape and extending in a direction of a center axis, and flange portions 17b opposed to each other and extending outward from opposite ends of the ring body 17a in the direction of the center axis (see FIG. 3). The seat ring 17 is formed, at positions opposed to each other in the radial direction of the ring body 17a, with a pair of through-holes 17c and 17c for allowing the first valve stem 15a and the second valve stem 15b to pass therethrough. The outer peripheral edge portion of the valve element 19 comes in contact with the inner peripheral surface of the ring body 17a, thereby providing sealing between the inner peripheral surface of the seat ring 17 and the outer peripheral edge portion of the valve element 19 to be able to close the internal flow passage 13a with the valve element 19.

The valve element 19 is placed inside the seat ring 17 attached to the inner peripheral surface of the internal flow passage 13a of the valve body 13. The valve element 19 is an integral piece including a contour member 33 formed of a synthetic resin material and having a substantially disk-shaped outer shape, and a core member 35 formed of a metal material and surrounded by the contour member 33. The valve element 19 in this embodiment is molded by injecting a synthetic resin material, which forms the contour member 33, into a mold for injection molding with the core member 35 placed inside in advance. In this embodiment, PVDF, which has high chemical resistance, is used as the synthetic resin material forming the contour member 33, but the material used for the contour member 33 is not limited to this, and other synthetic resin materials such as PP, PVC, PE, PFA, and PDCPD can be used. Further, in the present embodiment, an aluminum alloy for casting is used as the metal material for forming the core member 35, but the material used for the core member 35 is not limited to this, and the core member 35 may be formed of other metal materials similar to the valve stem or from non-metal materials, as long as they have higher mechanical strength than the contour member 33.

The valve element 19 has a first valve-stem hole 37 and a second valve-stem hole 39 provided in the outer peripheral portion thereof at opposing positions along the rotation axis R so as to be formed coaxially with the rotation axis R. When the first valve stem 15a and the second valve stem 15b are formed integrally so that the valve stem 15 is a single valve stem 15, the first valve-stem hole 37 and the second valve-stem hole 39 are also formed as a single through-hole.

The first valve-stem hole 37 includes a first large-diameter hole portion 37a of a relatively larger diameter including an open end (opening to the internal flow passage 13a), and a first small-diameter hole portion 37b of a relatively smaller diameter extending inward from the first large-diameter hole portion 37a in the direction of the rotation axis R. The inner peripheral surface of the first large-diameter hole portion 37a is formed by the contour member 33, while the inner peripheral surface of the first small-diameter hole portion 37b is formed by the core member 35. The first valve stem 15a and the first bushing 21a extending from the first bearing hole 25 of the valve body 13 through the through-hole 17c of the seat ring 17 and protruding from the through-hole 17c are inserted into the first valve-stem hole 37, so that the first large-diameter hole portion 37a of the first valve-stem hole 37 supports the first valve stem 15a via the first bushing 21a. The first bushing 21a is not inserted into the first small-diameter hole portion 37b, and the portion of the first valve stem 15a located on the distal end side (hereinafter referred to as the distal end portion) is directly inserted into the first small-diameter hole portion 37b, so that the distal end portion of the first valve stem 15a is fitted into the first small-diameter hole portion 37b so as not to be rotatable about the rotation axis R. For instance, the distal end portion of the first valve stem 15a and the first small-diameter hole portion 37b may be formed to have complementary polygonal or circular two-chamfered shapes, whereby the distal end portion of the first valve stem 15a and the first small-diameter hole portion 37b can be fitted together so as not to be rotatable. However, the method of fitting the first valve stem 15a and the first small-diameter hole portion 37b is not limited as long as the distal end portion of the first valve stem 15a and the first small-diameter hole portion 37b can be fitted so as not to be rotatable.

As in the first valve-stem hole 37, the second valve-stem hole 39 includes a second large-diameter hole portion 39a of a relatively larger diameter including an open end (opening to the internal flow passage 13a), and a second small-diameter hole portion 39b of a relatively smaller diameter extending inward from the second large-diameter hole portion 39a in the direction of the rotation axis R. The inner peripheral surface of the second large-diameter hole portion 39a is formed by the contour member 33, while the inner peripheral surface of the second small-diameter hole portion 39b is formed by the core member 35. The second valve stem 15b and the second bushing 21b extending from the second bearing hole 27 of the valve body 13 through the through-hole 17c of the seat ring 17 and protruding from the through-hole 17c are inserted into the second valve-stem hole 39, so that the second large-diameter hole portion 39a of the second valve-stem hole 39 supports the second valve stem 15b via the second bushing 21b. The second bushing 21b is not inserted into the second small-diameter hole portion 39b, and the portion of the second valve stem 15b located on the distal end side (hereinafter referred to as the distal end portion) is directly inserted into the second small-diameter hole portion 39b to be fitted therein. The second small-diameter hole portion 39b has a circular cross-sectional shape because rotational torque does not need to be transmitted between the second small-diameter hole portion 39b and the second valve stem 15b, and the second small-diameter hole portion 39b differs from the first small-diameter hole portion 37b of the first valve-stem hole 37 in this respect. However, the second small-diameter hole portion 39b may have the same configuration as the first small-diameter hole portion 37b.

In the following description, the contour member 33, which surrounds the first large-diameter hole portion 37a and the second large-diameter hole portion 39a to form the inner peripheral surfaces of the first large-diameter hole portion 37a and the second large-diameter hole portion 39a, may be specially described as a "stem hole component 41".

As described above, the first valve-stem hole 37 and the second valve-stem hole 39 have a similar configuration, except that the cross-sectional shapes of the first small-diameter hole portion 37b and the second small-diameter hole portion 39b are different. Thus, in the following description, the first valve-stem hole 37 will be mainly described as a representative of the first valve-stem hole 37 and the second valve-stem hole 39. For the valve stem, the first valve stem 15a will be described as a representative, and for the bushing, the first bushing 21a will be described as a representative. The descriptions of the first valve stem 15a, the first bushing 21a, and the first valve-stem hole 37 similarly apply to the second valve stem 15b, the second bushing 21b, and the second valve-stem hole 39. Furthermore, for the sake of brevity of description, the "first" for each element may be omitted. This does not apply if it is necessary to distinguish between "first" and "second".

In this embodiment, the bushing 21 (the first bushing 21a and the second bushing 21b) is made of PVDF, which has high resistance to corrosive fluid. A plurality of sealing members 43 such as O-rings are provided on the outer peripheral surface of the bushing 21a to prevent fluid from entering the interior of the valve element 19 and prevent fluid from coming in contact with the valve stem 15. In the embodiment shown in FIG. 1, four sealing members 43 are placed on the portion of the bushing 21a that is inserted into the large-diameter hole portion 37a of the valve-stem hole 37.

The core member 35 includes a central portion 35a and a substantially lattice-shaped main reinforcement portion 35b that is provided laterally (left-right) symmetrically around the central portion 35a. Substantially tubular stem-hole reinforcement portions 35c, 35c are provided at the upper end and the lower end of the central portion 35a. In the shown embodiment, the stem-hole reinforcement portions 35c, 35c include substantially rectangular parallelepiped portions at the upper and lower ends of the central portion 35a, where holes with diameters larger than the first and second valve-stem holes 37 and 39 are formed in these rectangular parallelepiped portions. Preferably, the stem-hole reinforcement portions 35c and the central portion 35a have the same outer shape. These stem-hole reinforcement portions 35c each extend into the stem hole component 41 making up the large-diameter hole portion 37a, and surround at least a part of the radially outer side of the large-diameter hole portion 37a in the direction of the rotation axis to reinforce the stem hole component 41 formed of a resin material. When the large-diameter hole portion 37a supports the shear force and bending moment generated in the valve element 19 due to the fluid pressure acting on the valve element 19, the stem-hole reinforcement portion 35c supports the force acting on the large-diameter hole portion 37a and the stem hole component 41 from the valve stem 15, thereby suppressing deformation of the stem hole component 41. As a result, the sealing provided by the sealing members 43 between the inner peripheral surface of the large-diameter hole portion 37a and the outer peripheral surface of the bushing 21a can be kept reliably. As shown in FIGS. 1 and 2, preferably, the stem-hole reinforcement portions 35c are formed with a plurality of through-holes 35d penetrating through the inner peripheral surface and the outer peripheral surface of the stem-hole reinforcement portions 35c. These through-holes 35d function as passages for the synthetic resin material forming the stem hole component 41 when the contour member 33 is manufactured by injection molding while placing the core member 35 in a mold, thereby suppressing occurrence of injection molding failure.

Further, the stem-hole reinforcement portions 35c surround the radially outer sides of the first valve-stem hole 37 and the second valve-stem hole 39, and are spaced apart from the inner peripheral surfaces of the first valve-stem hole 37 and the second valve-stem hole 39. The stem-hole reinforcement portions 35c thus are configured to be embedded in the stem hole component 41 so as not to be exposed to the insides of the first valve-stem hole 37 and the second valve-stem hole 39. This is because the stem-hole reinforcement portions 35c, 35c made of metal could be prevented from coming in contact with corrosive liquid even if the corrosive liquid flows into the first large-diameter hole portion 37a of the first valve-stem hole 37 and the second large-diameter hole portion 39a of the second valve-stem hole 39.

The butterfly valve 11 is further provided with a characteristic structure (hereinafter described as "torque reduction structure") for reducing the operating torque during operation for rotating the valve element 19 about the rotation axis R to close the internal flow passage 13a with the valve element 19, and a structural feature (hereinafter described as the "sealability performance improvement structure") for improving sealability between the inner peripheral surface of the seat ring 17 and the outer peripheral edge portion of the valve element 19 in closing the valve.

The torque reduction structure and the sealability improvement structure will be described below in detail with reference with FIGS. 3 to 14. Note here that the butterfly valve 11 in FIG. 1 is symmetrical between the upper and lower parts, for the structure of the inner peripheral surface of the internal flow passage 13a of the valve body 13, the structure of the seat ring 17, and the structure of the outer peripheral edge portion of the valve element 19. Therefore, although the upper part will be mainly described in the following description, the lower part has the same structure as the upper part and the following description also applies to the structure of the lower part.

Figure 3:
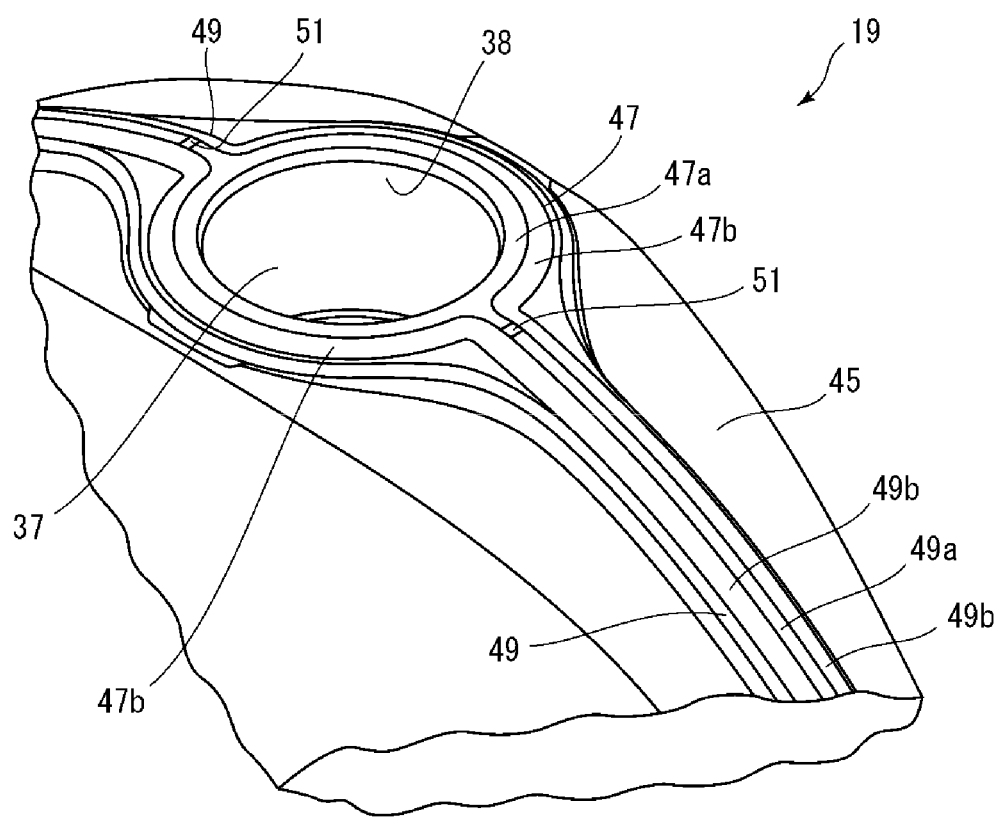
FIG. 3 is a partially enlarged perspective view showing a structure of a part around a valve stem hole on the outer peripheral edge surface of the valve element of the butterfly valve shown in FIG. 1.
Figure 4:
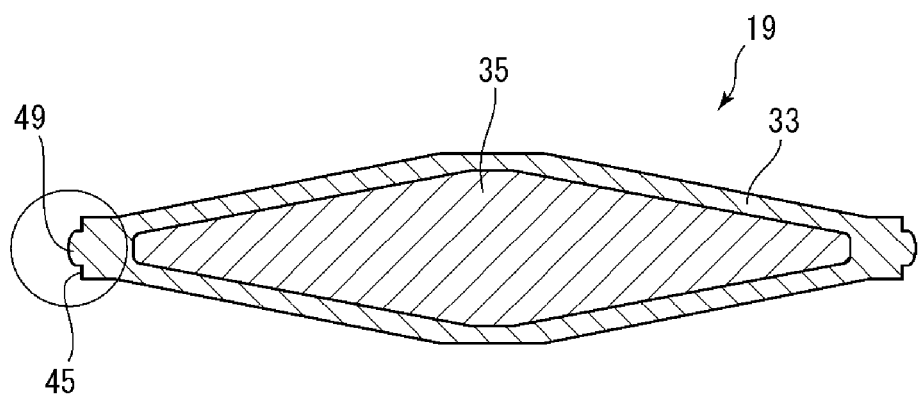
FIG. 4 is a horizontal cross-sectional view of the valve element shown in FIG. 2, taken along a horizontal cross-section passing through the center of the valve element.

First, referring to FIGS. 3 and 4, the structure of the valve element 19 which is related to the torque reduction structure and the sealability improvement structure will be described in detail.

The disk-shaped valve element 19 (in detail, the contour member 33 thereof) has an outer peripheral edge surface 45 circumferentially extending on the peripheral portion thereof, and is provided with the first valve-stem hole 37 and the second valve-stem hole 39 at opposite positions in the direction of the rotation axis on the outer peripheral edge surface 45. The first valve-stem hole 37 and the second valve-stem hole 39 are open to the outer peripheral edge surface 45 of the valve element 19 to form two valve stem openings (FIG. 3 shows only the valve-stem opening 38 of the first valve-stem hole 37) on the outer peripheral edge surface 45. The outer peripheral edge surface 45 of the valve element 19 is further provided with a raised portion protruding radially outward from the outer peripheral edge surface 45. The raised portion includes two opening raised portions 47 extending annularly along the periphery of each of the two valve stem openings on the outer peripheral edge surface 45, and two peripheral edge raised portions 49 extending like an arc along the outer peripheral edge surface 45 of the valve element so as to connect between the two opening raised portions 47.

Figure 5:
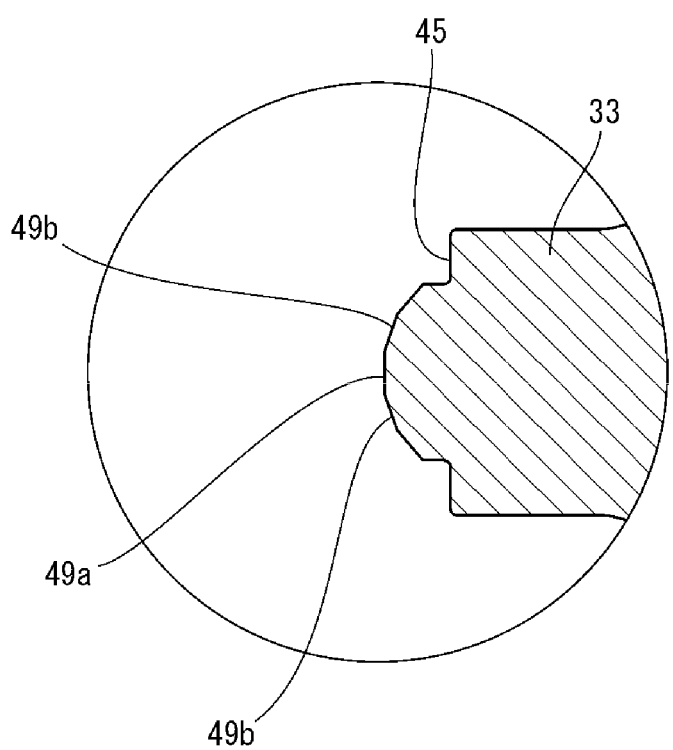
FIG. 5 is an enlarged cross-sectional view of the butterfly valve shown in FIG. 4, showing a part surrounded by the circle of the butterfly valve in an enlarged scale.

Each of the peripheral edge raised portions 49 has a peripheral edge sealing surface 49a extending along the top thereof and chamfered surfaces 49b extending along both sides of the peripheral edge sealing surface 49a. As shown in FIGS. 4 and 5, the peripheral edge sealing surface 49a is formed to extend in the circumferential direction of the valve element 19 to be like an arc of the same radius and flat in the width direction (in the direction of the flow passage axis when the valve element 19 has been turned to the closed state). Each of the chamfered surfaces 49b is an inclined surface extending to be to be inclined at a predetermined angle relative to the peripheral edge sealing surface 49a toward the outer peripheral edge surface 45 of the valve element 19. In this way, the valve element 19 has the chamfered surfaces 49b provided on both sides of the peripheral edge sealing surface 49a at the top of the peripheral edge raised portion 49. This can achieve the effect of reducing the operating torque for rotating the valve element 19 when the valve element 19 is rotated about the rotation axis R to bring the peripheral edge sealing surface 49a of the peripheral edge raised portion 49 into pressure contact with a valve seat surface 17d (described later) provided on the seat ring 17 attached to the inner peripheral surface of the internal flow passage 13a of the valve body 13. Similarly, the opening raised portion 47 has a planar opening sealing surface 47a extending annularly along the top thereof and chamfered surfaces 47b extending along both sides (inside and outside thereof) of the annular opening sealing surface 47a. The opening sealing surface 47a is formed so that the entire of the opening sealing surface 47a lies within the same plane. Each of the chamfered surfaces 47b is an inclined surface extending to be inclined at a predetermined angle relative to the opening sealing surface 47 toward the outer peripheral edge surface 45 of the valve element 19. The planar opening sealing surface 47a and the arc-shaped peripheral edge sealing surface 49a are smoothly connected by an outer peripheral transition surface 51 that is provided between the opening sealing surface 47a and the peripheral edge sealing surface 49a and is curved so that the curvature changes with the same width as the peripheral edge sealing surface 49a.

The angle formed by each of the chamfered surfaces 47b relative to the opening sealing surface 47a and the angle formed by each of the chamfered surfaces 49b relative to the peripheral edge sealing surface 49a are preferably selected from the range of 15° to 30° because the effect of reducing the operating torque for rotating the valve element 19 by using the valve stem 15 is increased in this range, more preferably from the range of 20° to 25°. The angles less than 15° will increase the friction between the chamfered surfaces 49b and the valve seat surface 17d, thereby increasing the operating torque. The angles greater than 30° decrease the amount of contact (contact area) between the chamfered surfaces 49b and the valve seat surface 17d, so that the corner between the peripheral edge sealing surface 49a and the chamfered surface 49b will push the valve seat surface 17d to dig into the valve seat surface 17d, thereby increasing the resistance and also the operating torque. The angles in the range from 15° to 30° allow the chamfered surfaces 47b to function as a guide, so that the peripheral edge raised portion 49 smoothly digs into the valve seat surface 17d, thereby reducing the operating torque. The angles of 20° or more increase the surface pressure of the peripheral edge sealing surface 49a, thereby enhancing sealability, and the angles of 25° or less increase the amount of contact (contact area) of the chamfered surfaces 49b with the valve seat surface 17d, thereby reducing the resistance of the peripheral edge sealing surface 49a against the valve seat surface 17d, and suppressing wear of the peripheral edge sealing surface 49a. The opening sealing surface 47a and the peripheral edge sealing surface 49a are surfaces which mainly come in contact with a through-hole sealing surface 61 described later and the valve seat surface 17d of the seat ring 17, respectively. Therefore, the narrower the widths of the opening sealing surface 47a and the peripheral edge sealing surface 49a are, the greater the surface pressure between the through-hole sealing surface 61 or the valve seat surface 17d and the valve element 19 is, which improves sealability but degrades the resistance to abrasion. The butterfly valve 11 is expected to be used in the scenes of repeatedly opening and closing. Therefore, the widths of the opening sealing surface 47a and the peripheral edge sealing surface 49a are preferably selected from the range of 3 mm to 10 mm in order to achieve both of better sealing performance and resistance to abrasion.

Figure 6:
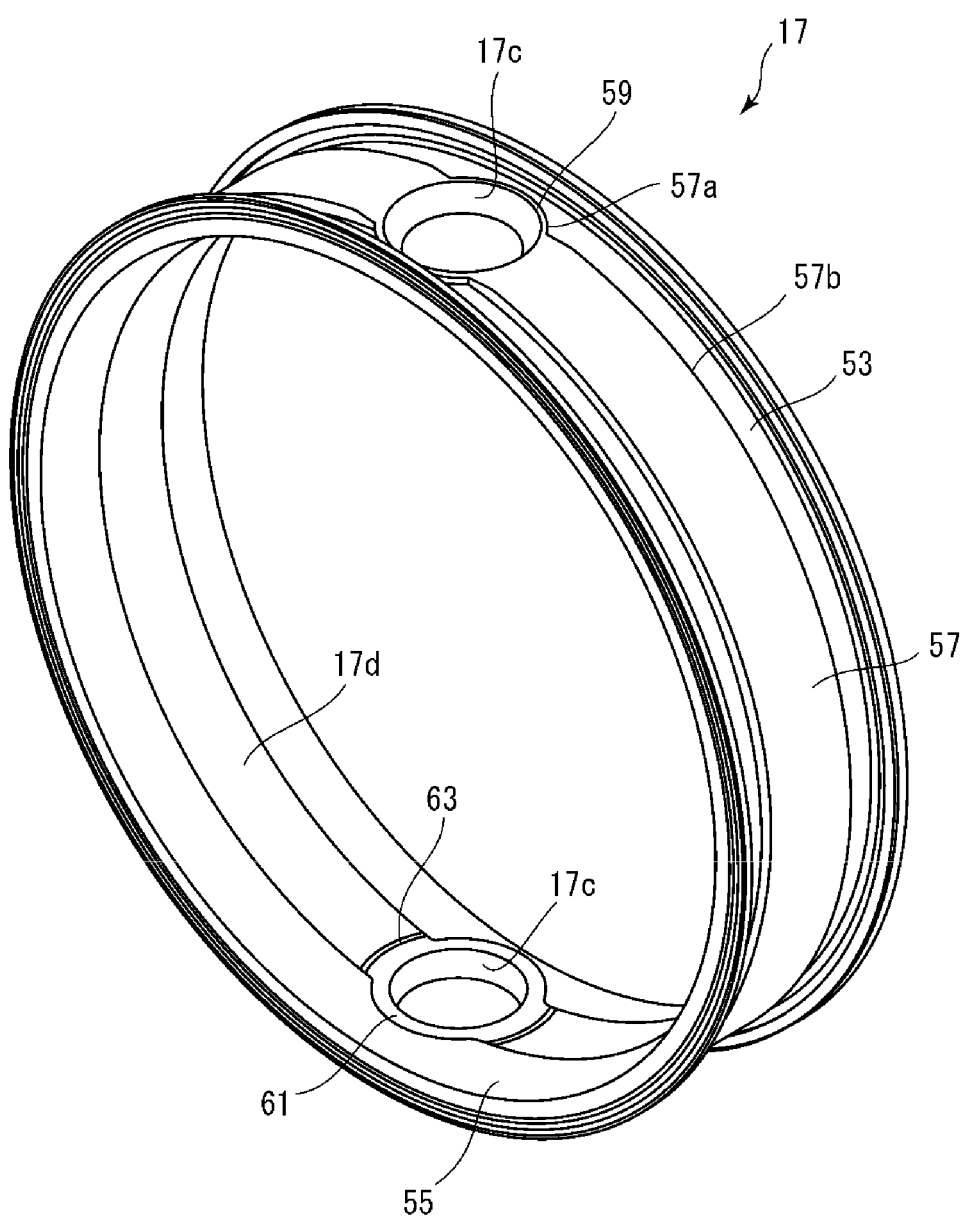
FIG. 6 is a perspective view showing a seat ring of the butterfly valve shown in FIG. 1.

As described above, the seat ring 17 includes the ring body 17a having a substantially cylindrical shape and extending in the direction of the center axis, and the flange portions 17b opposed to each other and extending outward from opposite ends of the ring body 17a in the direction of the center axis. As shown in FIG. 6, the ring body 17a has an outer peripheral surface 53 and an inner peripheral surface 55, and is formed at positions of the ring body 17a facing each other in the direction of the rotation axis R with two through-holes 17c and 17c which extend so as to penetrate from the outer peripheral surface 53 to the inner peripheral surface 55 in order to allow the valve stem 15 to pass therethrough. The seat ring 17 is provided, at the central portion of the outer peripheral surface 53 in the width direction (that is, the direction of the center axis), with an annular protrusion 57 protruding from the outer peripheral surface 53 and extending annularly in the circumferential direction of the outer peripheral surface 53.

The inner peripheral surface of the through-hole 17c of the seat ring 17 shown in FIG. 6 is formed by a flat circumferential surface. However, the inner peripheral surface 17 of the through-hole 17c may be formed thereon with a plurality of annular ribs to enhance the sealability between the outer peripheral surface of the valve stem 15 inserted through the through-hole 17c and the inner peripheral surface of the through-hole 17c.

The annular protrusion 57 is fitted into an annular fitting groove (described later) provided on the inner peripheral surface of the internal flow passage 13a of the valve body 13, and functions to prevent the seat ring 17 from moving in the direction of the flow passage axis. The annular protrusion 57 includes two through-hole protrusion portions 57a, 57a provided at the peripheral edge portion (periphery) surrounding the openings of the two through-holes 17c, 17c on the outer peripheral surface 53, and two outer peripheral protrusion portions 57b, 57b extending like an arc in the circumferential direction of the ring body 17a to connect between the two through-hole protrusion portions 57a, 57a. The outer peripheral protrusion portion 57b has a rectangular cross section, and is provided with a top surface extending to be flat (i.e., with the same height from the outer peripheral surface 53) in the width direction (in the direction of the center axis of the ring body 17a) and to be like an arc in the circumferential direction. The top of the through-hole protrusion portion 57a is formed to have a planar protrusion portion sealing surface 59 lying within the same plane, and the protrusion portion sealing surface 59 is connected to the top surface of the outer peripheral protrusion portion 57b that is flat in the width direction.

Figure 7:
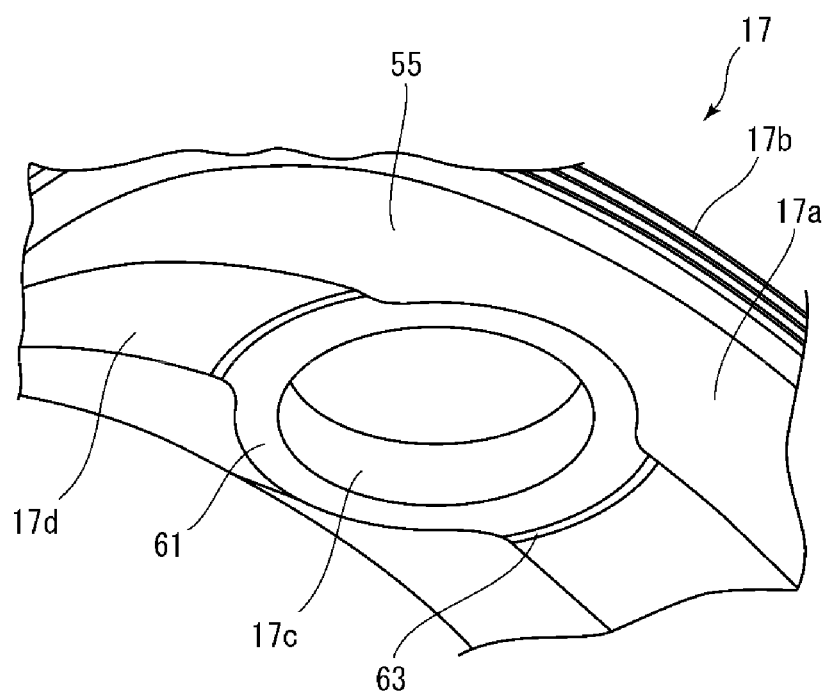
FIG. 7 is a partially enlarged perspective view showing a structure of a part around an upper through-hole of the seat ring shown in FIG. 6, as viewed from the inner peripheral side.
Figure 8:
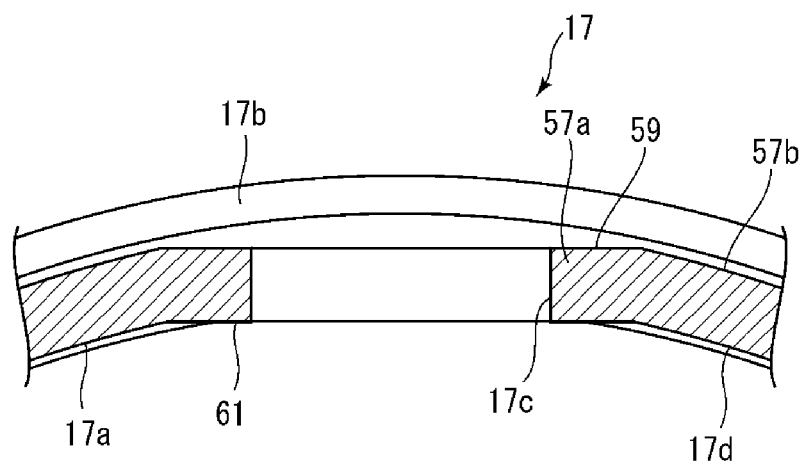
FIG. 8 is a cross-sectional view showing the structure of the part around the through-hole of the seat ring showing in FIG. 7.
Figure 9:
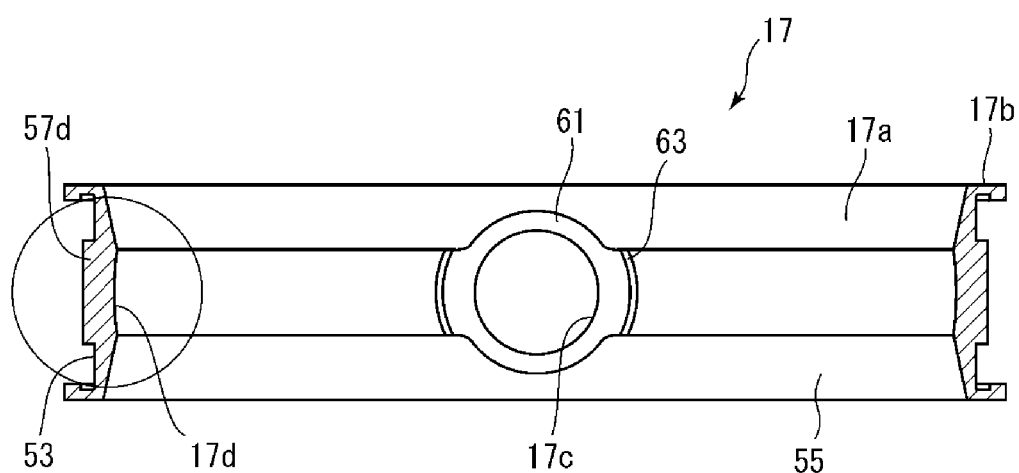
FIG. 9 is a cross-sectional view of the seat ring shown in FIG. 6, illustrating the state cut in half vertically.
Figure 10:
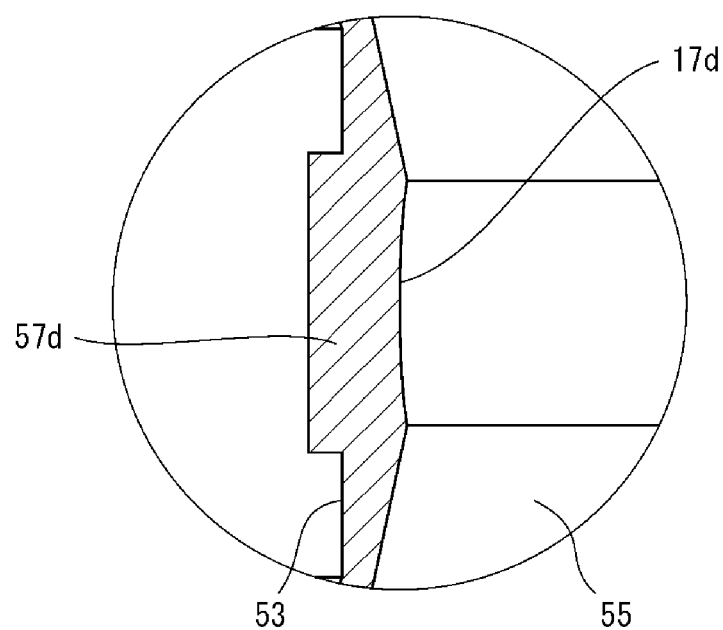
FIG. 10 is an enlarged cross-sectional view, showing a part surrounded by the circle of the seat ring shown in FIG. 9, in an enlarged scale.

As well shown in FIGS. 7 and 8, the inner peripheral surface 55 is formed thereon with two annular through-hole sealing surfaces 61, 61 extending in the peripheral edge portion (periphery) surrounding the openings of the two through-holes 17c, 17c (openings opened to the internal flow passage 13a), a valve seat surface 17d extending like an arc in the circumferential direction of the inner peripheral surface 55 to connect between the two through-hole sealing surfaces 61, 61, and an inner peripheral transition surface 63 connecting between the through-hole sealing surface 61 and the valve seat surface 17d. The annular through-hole sealing surface 61 is formed to be planar so that it lies in the same plane, and extends parallel to the protrusion portion sealing surface 59 formed at the peripheral edge portion of the opening of the through-hole 17c on the outer peripheral surface 53. The thickness from the through-hole sealing surface 61 to the protrusion portion sealing surface 59 is set to be equal to the thickness from the valve seat surface 17d of the inner peripheral surface 55 of the seat ring 17 to the top surface of the outer peripheral protrusion portion 57b of the outer peripheral surface 53. The thickness from the through-hole sealing surface 61 to the protrusion portion sealing surface 59 is equal to the thickness from the valve seat surface 17d to the top surface of the outer peripheral protrusion portion 57b, because the crushing margin of the seat ring 17 by the raised portion on the outer peripheral edge surface 45 of the valve element 19 is made uniform in closing the valve. The thickness from the valve seat surface 17d to the top surface of the outer peripheral protrusion portion 57b is measured at the part having the shortest distance between the valve seat surface 17d and the outer peripheral protrusion portion 57b. As shown in FIGS. 9 and 10, the valve seat surface 17d has a concave shape formed so as to be a part of the sphere centered about the center of the ring body 17a (the center in the diameter and width directions). The inner peripheral transition surface 63 is provided at a position to come in contact with the outer peripheral transition surface 51 in closing the valve, and extends like an arc having a predetermined width and being coaxial with the through-hole 17c.

The annular protrusion 57 on the outer peripheral surface 53 of the seat ring 17 is opposed to the valve seat surface 17d, which is provided on the inner peripheral surface 55, in the radial direction of the ring body 17a, and when the opening sealing surface 47a of the opening raised portion 47 and the peripheral edge sealing surface 49a of the peripheral edge raised portion 49 of the valve element 19 come into pressure contact with the through-hole sealing surface 61 and the valve seat surface 17d of the seat ring 17, respectively, in closing the valve, the portion of the seat ring 17 between the through-hole sealing surface 61 and the protrusion portion sealing surface 59 and the portion of the seat ring 17 between the valve seat surface 17d and the top face of the peripheral protrusion 57b are elastically compressed to provide sealing between the outer peripheral edge portion of the valve element 19 and the inner peripheral surface 55 of the seat ring 17. In seat rings of conventional butterfly valves, the through-hole protrusion portion protrudes more largely from the outer peripheral surface and is thicker than the outer peripheral protrusion portion of the annular protrusion, and the crushing margin of the seat ring in the state of the closed valve is different between the portion provided with the outer peripheral protrusion portion and the portion provided with the through-hole protrusion portion. Therefore, the crushing rate changes according to the areas of the seat ring in the circumferential direction, resulting in non-uniform sealability. However, the butterfly valve 11 is configured so that the thickness from the through-hole sealing surface 61 to the protrusion portion sealing surface 59 of the through-hole protrusion portion 57a is equal to the thickness from the valve seat surface 17d of the ring body 17a of the seat ring 17 to the top surface of the outer peripheral protrusion portion 57b. As a result, the crushing margin in closing the valve is equal between the portion provided with the outer peripheral protrusion portion 57b and the portion provided with the through-hole protrusion portion 57a, and the crushing rate does not change according to the areas of the seat ring 17 in the circumferential direction. Therefore, the butterfly valve 11 can achieve the effect of making the sealability between the outer peripheral edge portion of the valve element 19 and the inner peripheral surface 55 of the seat ring 17 uniform at any areas in the circumferential direction.

In the butterfly valve 11, the inner peripheral transition surface 63 on the inner peripheral surface 55 of the seat ring 17 is positioned to be in contact with the outer peripheral transition surface 51 of the raised portion on the outer peripheral edge surface 45 of the valve element 19 when the valve is closed. Furthermore, the outer peripheral transition surface 51 has the same width as the peripheral edge sealing surface 49a, and thus has a small width which come in contact with the inner peripheral transition surface 63, and the inner peripheral transition surface 63 extends like an arc to be coaxial with the through-hole 17c. The outer peripheral transition surface 51 provided on the raised portion of the valve element 19 rotates about the rotation axis R as the valve element 19 rotates. Therefore, if the outer peripheral transition surface 51 is wide and the valve seat surface 17d does not have a concave shape formed like a part of a spherical surface but has a cylindrical shape as in the conventional butterfly valves, the outer peripheral transition surface 51 and the inner peripheral transition surface 63 are in a positional relationship of intersecting with each other until immediately before the valve being closed. As a result, in the vicinity of the inner peripheral transition surface 63 of the seat ring 17, the crushing rate is likely to be uneven until the valve is closed. Further, even if the rotation angle of the valve element 19 is slightly deviated in closing the valve, the crushing rate in the portion near the inner peripheral transition surface 63 becomes uneven. In the butterfly valve 11, however, the outer peripheral transition surface 51 is narrower and the inner peripheral transition surface 63 extends like an arc so that it is coaxial with the through-hole 17c. Therefore, the outer peripheral transition surface 51 moves along the inner peripheral transition surface 63 during the rotation process of the valve element 19 to the state of the closed valve, and as a result, the crushing rate is less likely to become uneven.

Figure 11:
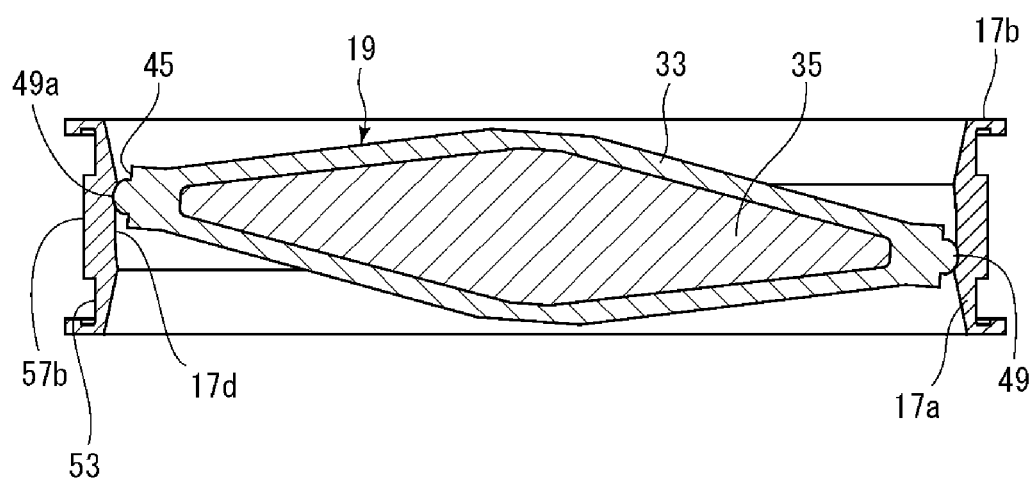
FIG. 11 is an explanatory view illustrating a state of the butterfly valve according to the present invention in cross-section where the valve element thereof is rotated from the open valve state until the outer peripheral edge surface of the valve element comes in contact with the seat surface of the seat ring.

Further, for the seat ring 17 of the butterfly valve 11, the width of the outer peripheral protrusion portion 57b of the annular protrusion 57 (length in the direction of the center axis of the ring body 17a) is determined to be wider than the width of the valve seat surface 17d, as shown in FIGS. 9 and 10. If the width of the valve seat surface 17d was wider than the width of the outer peripheral protrusion portion 57b, the following situations might happen: when the peripheral edge sealing surface 49a of the peripheral edge raised portion 49 of the outer peripheral edge surface 45 of the valve element 19 begins to come into contact with the valve seat surface 17d, the outer peripheral protrusion portion 57b of the annular protrusion 57 does not exist between the inner peripheral surface of the internal flow passage 13a of the valve body 13 and a contact area between the peripheral edge sealing surface 49a of the valve element 19 and the valve seat surface 17d of the seat ring 17 attached to the inner peripheral surface of the internal flow passage 13a. In this case, during transition to the state where the outer peripheral protrusion portion 57b of the annular protrusion 57 exists between the inner peripheral surface of the internal flow passage 13a of the valve body 13 to which the seat ring 17 is attached and the contact area between the peripheral edge sealing surface 49a and the valve seat surface 17d, the crushing margin of the seat ring 17 changes discontinuously with the rotational position of the valve element 19, so that the operating torque and sealing performance of the valve element 19 will also change discontinuously. In the butterfly valve 11, however, the width of the outer peripheral protrusion portion 57b is wider than the width of the valve seat surface 17d. In this case, as shown in FIG. 11, when the peripheral edge sealing surface 49a of the peripheral edge raised portion 49 of the outer peripheral edge surface 45 of the valve element 19 begins to come into contact with the valve seat surface 17d of the seat ring 17, the outer peripheral protrusion portion 57b of the annular protrusion 57 always exists between the inner peripheral surface of the internal flow passage 13a of the valve body 13, to which the seat ring 17 is attached, and a contact area between the peripheral edge sealing surface 49a and the valve seat surface 17d. Therefore, after the peripheral edge sealing surface 49a of the valve element 19 comes into contact with the valve seat surface 17d of the seat ring 17 when the valve is closed, the crushing margin of the seat ring 17 hardly changes with the rotational position of the valve element 19, so that the operating torque and sealing performance of the valve element 19 also hardly change.

Figure 12:
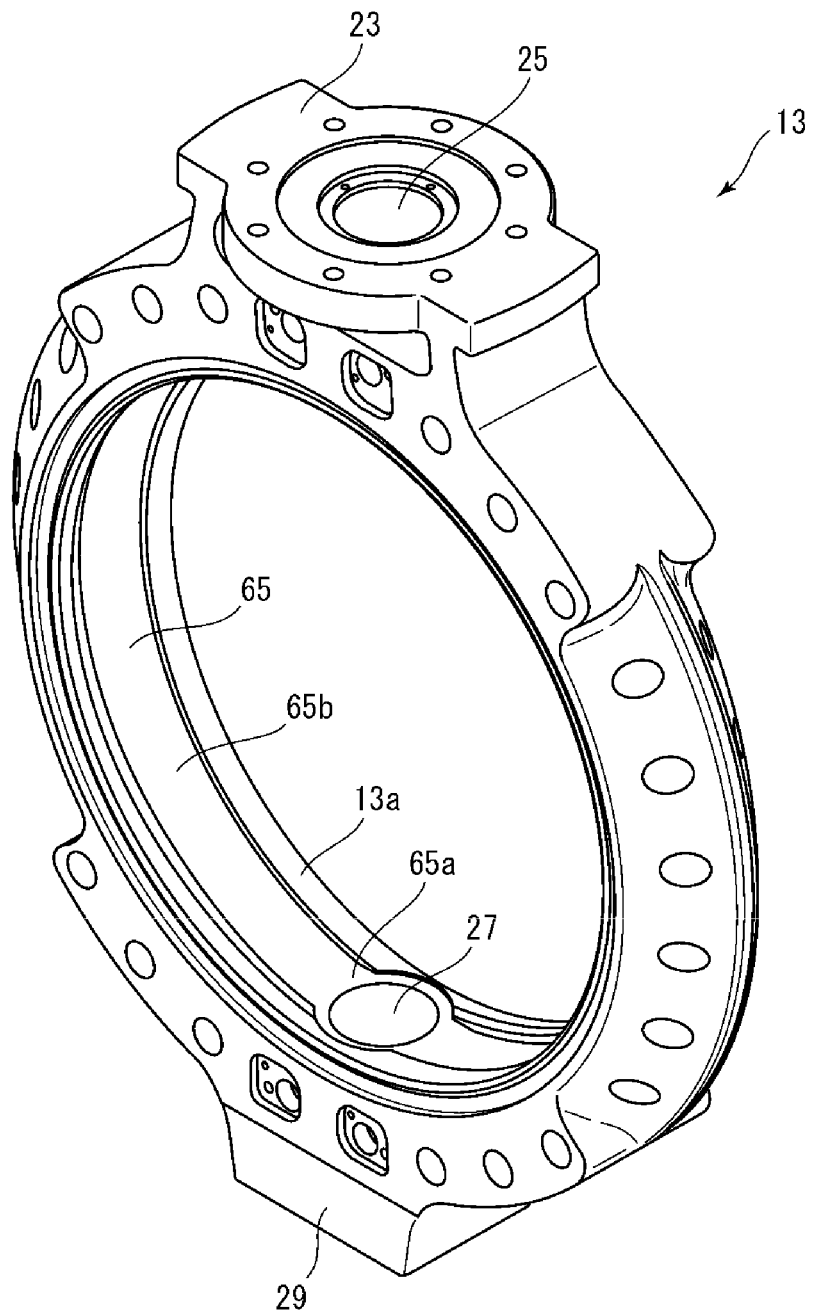
FIG. 12 is a perspective view showing the overall configuration of the valve body of the butterfly valve shown in FIG. 1.
Figure 13:
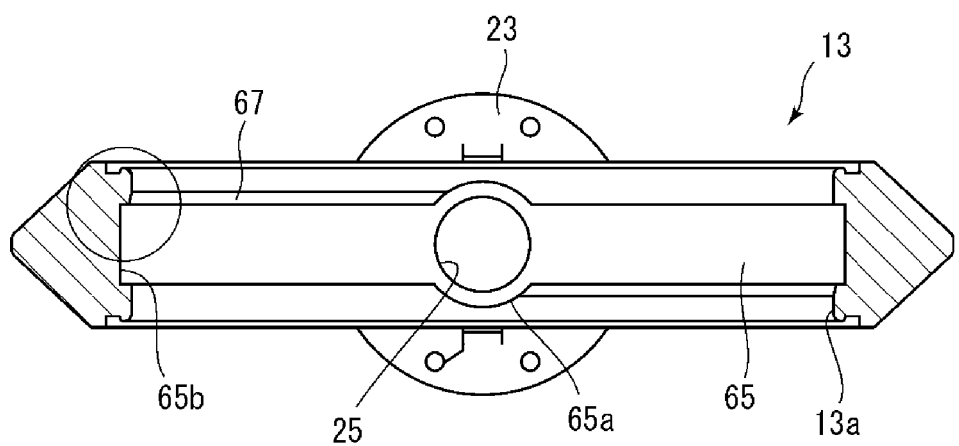
FIG. 13 is a cross-sectional view showing the valve body of the butterfly valve shown in FIG. 1, taken along a horizontal cross section passing through the center of the internal flow passage.
Figure 14:
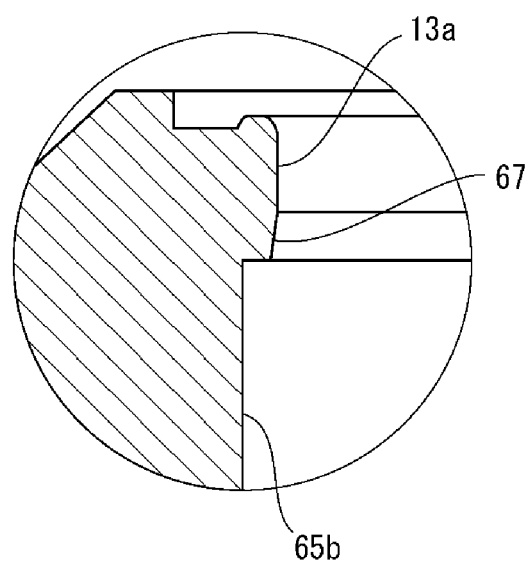
FIG. 14 is an enlarged cross-sectional view, showing the part surrounded by the circle shown in FIG. 13.

As shown in FIG. 12, the valve body 13 has a substantially cylindrical shape with the internal flow passage 13a formed in the central portion. The valve body 13 is formed with the first bearing hole 25 and the second bearing hole 27 extending in the radial direction (the vertical direction in FIG. 12) of the internal flow passage 13a to be opposed to each other. The valve body 13 is formed at the top thereof with the top flange 23, and the first bearing hole 25 extends through the top flange 23 to the outside. The second bearing hole 27 is closed at the lower end thereof by the valve stem holder 29.

The valve body 13 is provided on the inner peripheral surface of the internal flow passage 13a thereof with an annular fitting groove 65 into which the annular protrusion 57 of the seat ring 17 is fitted. The annular fitting groove 65 has a shape complementary to the annular protrusion 57 of the seat ring 17. Specifically, the annular fitting groove 65 includes two opening groove portions 65a, which have planar groove bottom surfaces and are formed around the openings of the first bearing hole 25 and the second bearing hole 27 leading to the internal flow passage 13a, and peripheral edge groove portions 65b, 65b, which have a shape complementary to the outer peripheral protrusion portion 57b and have two curved bottom surfaces connecting between the two opening groove portions 65a and 65a and extending like an arc. The peripheral edge groove portion 65b has a substantially rectangular cross section that is complementary to the outer peripheral protrusion portion 57b.

As shown in FIG. 12, the outer peripheral portion of the valve body 13 is provided with a thickness reduction part for weight reduction. However, predetermined regions near the first bearing hole 25 and the second bearing hole 27 are provided with no thickness reduction parts and are formed to be thicker than the remaining portions. This is because pushing of the valve body 13 into the internal flow passage 13a (specifically, the inside of the seat ring 17 attached to the inner peripheral surface of the internal flow passage 13a) will make the valve body 13 be deformed to stretch in the direction of the rotation axis R and to be shrunk in the diametrical direction of the internal flow passage 13a, that is, the direction perpendicular to the rotation axis R, and such deformation of the valve body 13 could be suppressed. Preferably, the region with no thickness reduction part is located on both sides of the rotation axis R within a range of 40° to 60° around the center of the internal flow passage 13a from the rotation axis R.

In the annular fitting groove 65, one of the two peripheral edge groove portions 65b, 65b is provided with a chamfered surface 67 at the upper edge portion of the peripheral edge groove portion 65b positioned on the downstream side of the internal flow passage 13a (the edge adjacent to the peripheral edge groove portion 65b of the inner peripheral surface located on the downstream of the peripheral edge groove portion 65b in the internal flow passage 13a), and the other of the two peripheral edge groove portions 65b, 65b is provided with a chamfered surface 67 at the upper edge portion of the peripheral edge groove portion 65b positioned on the upstream side of the internal flow passage 13a. These chamfered surfaces 67 form a space between the inner peripheral surface of the internal flow passage 13a and the outer peripheral surface of the seat ring 17 when the seat ring 17 is attached to the inner peripheral surface of the internal flow passage 13a by fitting the annular protrusions 57 into the annular fitting grooves 65, thereby providing an escape allowance for deformation of the seat ring 17. Therefore, by providing the chamfered surfaces 67 on the side where the outer peripheral edge portion of the valve element 19 is rotated about the rotation axis R to enter the valve seat surface 17d of the seat ring 17 in order to change the valve from the opened state to the closed state, there can be provided an escape space for the deformation of the seat ring 17 when the peripheral edge sealing surface 49a of the peripheral edge raised portion 49 of the valve element 19 begins to come into contact with the valve seat surface 17d (that is, when seated). As a result, this suppresses the phenomenon that the operating torque of the valve stem 15 goes up before the valve is completely closed, thereby improving the operability. Preferably, the chamfered surface 67 is formed as an inclined surface. Preferably, the angle formed between each inclined surface and the extended plane of the side surface of the peripheral edge groove portion 65b is determined to match the angle of rotation of the valve element 19 when the peripheral edge sealing surface 49a of the peripheral edge raised portion 49 of the valve element 19 comes in contact with the chamfered surface 67 that is the inclined surface, where the angle of rotation of the valve element 19 when the butterfly valve is fully open is set to 0°. For example, the angle formed between the inclined surface and the extended plane of the side surface of the peripheral edge groove portion 65b may be 80° to 85°.

The peripheral edge groove portion 65b of the annular fitting groove 65 is provided at the upper edges on both sides thereof with the chamfered surfaces 67. Preferably, however, in order not to reduce the effect of preventing the annular protrusion 57 of the seat ring 17 from moving relative to the annular fitting groove 65 in the direction of the flow passage axis, the peripheral edge groove portion 65b is provided only at the upper edge on one side thereof with the chamfered surface 67.

Examples

Figure 15:
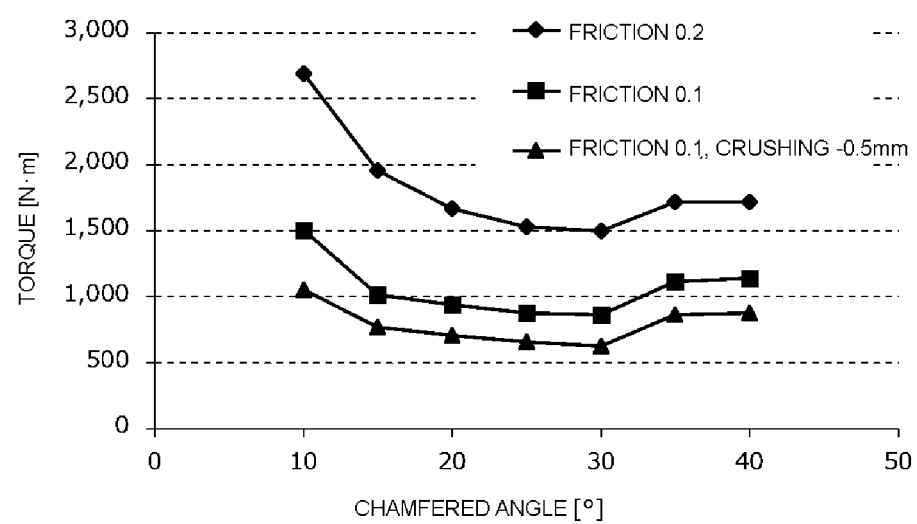
FIG. 15 is a line graph illustrating a relationship between an angle of a chamfered surface of the outer peripheral edge surface of the valve element and the operating torque of the valve stem in the butterfly valve according to the present invention, which was obtained by simulation while changing a coefficient of friction between the valve element and the seat ring.

FIG. 15 is a line graph showing a relationship between the angle of the chamfered surface 49b of the peripheral edge raised portion 49 on the outer peripheral edge surface 45 of the valve element 19 and the operating torque of the valve stem 15 in the butterfly valve 11 according to the present invention, which was obtained by simulation while changing the coefficient of friction between the valve element 19 and the seat ring 17. The simulation was performed under the following conditions: the width of the peripheral edge sealing surface 49a of the peripheral edge raised portion 49 was 4 mm, the chamfered surface 49b was provided until it was 3 mm vertically away from the peripheral edge sealing surface 49a, and the peripheral edge raised portion 49 came into pressure contact with the valve seat surface 17d of the seat ring 17 to crush the valve seat surface 17d by 3 mm. Then the operating torque of the valve element 19 was determined while changing the angle of the chamfered surface 49b (the angle of the chamfered surface 49b relative to the peripheral edge sealing surface 49a toward the outer peripheral edge surface 45). It was also assumed that the seat ring 17 was made of EPDM and the valve element 19 was formed of PP. The simulation was performed with the coefficient of friction between the valve element 19 and the seat ring 17 being 0.1 and 0.2. For the coefficient of friction of 0.1, the simulation was performed also under the condition that the amount of crushing of the valve seat surface 17d of the seat ring 17 by the peripheral edge raised portion 49 was 2.5 mm.

As can be seen from FIG. 15, the operating torque can be kept low when the angle of the chamfered surface 49b is in the range of 15° to 30° regardless of the conditions of the friction coefficient and the amount of crushing. Therefore, for the butterfly valve 11, the angle of the chamfered surface 49*b* is preferably set within the range of 15° to 30°.

While the butterfly valve 11 according to the present invention has been described above with reference to the embodiments shown in the figures, the present invention is not limited to the shown embodiments. For example, in the shown embodiment, the valve element 19 is rotatably supported by the valve body 13 with the two valve stems 15*a* and 15*b*. However, the valve element 19 may be supported by the valve body 13 with a single valve stem 15.

DESCRIPTION OF REFERENCE NUMERALS 11 butterfly valve
13 valve body
13*a* internal flow passage
15 valve stem
15*a* first valve stem
15*b* second valve stem
19 valve element
45 outer peripheral edge surface
47 opening raised portion
47*a* opening sealing surface
47*b* chamfered surface
49 peripheral edge raised portion
49*a* peripheral edge sealing surface
49*b* chamfered surface
51 outer peripheral transition surface
53 outer peripheral surface
55 inner peripheral surface
57 annular protrusion
57*a* through-hole protrusion portion
57*b* outer peripheral protrusion portion
59 protrusion portion sealing surface
61 through-hole sealing surface
63 inner peripheral transition surface
65 fitting groove
65*a* opening groove portion
65*b* peripheral edge groove portion
67 chamfered surface

The invention claimed is:

1. A butterfly valve comprising: a valve body formed therein with an internal flow passage extending in a direction of a flow passage axis; a seat ring attached to an inner peripheral surface of the internal flow passage; a valve stem supported by the valve body to be rotatable about a rotation axis; a substantially disk-shaped valve element connected to the valve stem to be rotatably supported by the valve body and being placed in the seat ring, said internal passage being closed and opened by rotating the valve element about the rotation axis to bring a peripheral edge portion of the valve element into and out of contact with an inner peripheral surface of the seat ring, wherein the valve element has an annular outer peripheral edge surface circumferentially extending thereon, and is formed, at opposite positions in the direction of the rotation axis on the outer peripheral edge surface, with two valve stem openings for allowing the valve stem to pass therethrough, said outer peripheral edge surface of the valve element further provided with two annular opening raised portions each protruding from the outer peripheral edge surface and extending along the periphery of the corresponding valve stem opening, and peripheral edge raised portions each protruding from the outer peripheral edge surface and extending in the circumferential direction of the valve element so as to connect between the two opening raised portions, each of said peripheral edge raised portions having a peripheral edge sealing surface that extends along a top thereof to be like an arc in the circumferential direction and flat in the width direction, and chamfered surfaces inclined at a predetermined angle relative to the peripheral edge sealing surface toward the outer peripheral edge surface of the valve element and extending along both sides of the peripheral edge sealing surface, the seat ring is provided with an outer peripheral surface, an inner peripheral surface, and an annular protrusion protruding from the outer peripheral surface and extending annularly, and the valve body is provided on the inner peripheral surface of the internal flow passage with an annular fitting groove for the annular protrusion of the seat ring to fit therein, and the annular fitting groove is formed, at opposite positions in the direction of the rotation axis, with two bearing holes for the valve stem to be inserted and be supported therein, and the annular fitting groove includes two opening groove portions provided at the peripheries of the openings of the two bearing holes and two peripheral edge groove portions extending circumferentially so as to connect between the two opening grooves, one of said two peripheral edge groove portions being provided with a chamfered portion at an upper edge portion on a downstream side, the other of said two peripheral edge groove portions being provided with a chamfered portion at an upper edge portion on an upstream side.

2. The butterfly valve according to claim 1, wherein the predetermined angle ranges from 15° to 30°.

3. The butterfly valve according to claim 1, wherein the width of the peripheral edge sealing surface ranges from 3 mm to 10 mm.

4. The butterfly valve according to claim 1, wherein the peripheral edge groove portions of the annular fitting groove have a rectangular cross section, each of the chamfered portions is formed by an inclined surface, and an angle between the inclined surface and an extended plane of a side surface of the peripheral edge groove portion is determined to match an angle of rotation of the valve element when the peripheral edge sealing surface of the peripheral edge raised portion of the valve element comes in contact with the inclined surface, where the angle of rotation of the valve element when the butterfly valve is fully open is set to 0°.

5. The butterfly valve according to claim 1, wherein the seat ring is formed, at opposite positions in the direction of the rotation axis, with two through-holes extending from the outer peripheral surface to the inner peripheral surface in order to allow the valve stem to pass through the seat ring, and the seat ring is formed, on the inner peripheral surface, with two annular through-hole sealing surfaces each extending planarly at the periphery of the corresponding through-hole, and valve seat surfaces extending like an arc in the circumferential direction of the inner peripheral surface to connect between the two through-hole sealing surfaces, said annular protrusion having a width larger than that of the valve seat surface.

6. The butterfly valve according to claim 1, wherein the valve body is provided with a thickness reduction part on the outer periphery other than regions adjacent to the bearing holes on both sides of the rotation axis within a predetermined angle range around the center of the internal flow passage from the rotation axis.

7. The butterfly valve according to claim 6, wherein the predetermined angle is in the range of 40° to 60°.

8. A butterfly valve comprising: a valve body formed therein with an internal flow passage extending in a direction of a flow passage axis; a seat ring attached to an inner peripheral surface of the internal flow passage; a valve stem supported by the valve body to be rotatable about a rotation axis; a substantially disk-shaped valve element connected to the valve stem to be rotatably supported by the valve body and being placed in the seat ring, said internal passage being closed and opened by rotating the valve element about the rotation axis to bring a peripheral edge portion of the valve element into and out of contact with an inner peripheral surface of the seat ring, wherein the valve element has an annular outer peripheral edge surface circumferentially extending thereon, and is formed, at opposite positions in the direction of the rotation axis on the outer peripheral edge surface, with two valve stem openings for allowing the valve stem to pass therethrough, said outer peripheral edge surface of the valve element further provided with two annular opening raised portions each protruding from the outer peripheral edge surface and extending along the periphery of the corresponding valve stem opening, and peripheral edge raised portions each protruding from the outer peripheral edge surface and extending in the circumferential direction of the valve element so as to connect between the two opening raised portions, each of said peripheral edge raised portions having a peripheral edge sealing surface that extends along a top thereof to be like an arc in the circumferential direction and flat in the width direction, and chamfered surfaces inclined at a predetermined angle relative to the peripheral edge sealing surface toward the outer peripheral edge surface of the valve element and extending along both sides of the peripheral edge sealing surface, the seat ring is provided with an outer peripheral surface, an inner peripheral surface, and an annular protrusion protruding from the outer peripheral surface and extending annularly, and the valve body is provided on the inner peripheral surface of the internal flow passage with an annular fitting groove for the annular protrusion of the seat ring to fit therein, and the seat ring is formed, at opposite positions in the direction of the rotation axis, with two through-holes extending from the outer peripheral surface to the inner peripheral surface to allow the valve stem to pass through the seat ring, the seat ring is formed, on the inner peripheral surface thereof, with two annular through-hole sealing surfaces each extending at the periphery of the corresponding through-hole to extend planarly, valve seat surfaces extending like an arc in the circumferential direction of the inner peripheral surface to connect between the two through-hole sealing surfaces, and inner peripheral transition surfaces connecting between the through-hole sealing surfaces and the valve seat surfaces, and the valve element is formed, on the outer peripheral surface, with annular opening sealing surfaces each extending on a top of the corresponding opening raised portion, and outer peripheral transition surfaces connecting between the opening sealing surfaces and the peripheral edge sealing surfaces, each of said inner peripheral transition surface extending like an arc to be coaxial with the through-hole and being located at a position to come in contact with the outer peripheral transition surface in closing the valve.

9. The butterfly valve according to claim 8, wherein the valve seat surface formed on the inner peripheral surface of the seat ring has a concave shape formed like a part of a spherical surface.

10. The butterfly valve according to claim 8, wherein the annular protrusion includes two annular through-hole protrusion portions each provided at a peripheral edge portion of the corresponding through-hole on the outer peripheral surface of the seat ring, and two outer peripheral protrusion portions extending in the circumferential direction to connect between the two through-hole protrusion portions, each of the through-hole protrusion portions is formed on a top thereof with a protrusion portion sealing surface extending parallel to the through-hole sealing surface, and a thickness from the through-hole sealing surface to the protrusion portion sealing surface is equal to a thickness from the valve seat surface of the seat ring to a top of the outer peripheral protrusion portion.

* * * * *